June 30, 1942.    D. A. MEEKER ET AL    2,287,814
SCALE
Filed July 8, 1938    5 Sheets-Sheet 1

INVENTORS
David A. Meeker and
Kenneth C. Allen
BY Maréchal & Roe
ATTORNEYS

Patented June 30, 1942

2,287,814

UNITED STATES PATENT OFFICE 2,287,814

SCALE

David A. Meeker, Troy, and Kenneth C. Allen, Dayton, Ohio, assignors to The Hobart Manufacturing Company, Troy, Ohio, a corporation of Ohio Application July 8, 1938, Serial No. 218,240

17 Claims. (Cl. 265—38)

This invention relates to scales, and more particularly to scales of the computing type.

It is a principal object of the invention to provide a scale construction which is simple and light-weight, compact in size, and which is adapted to weigh quickly and accurately and to maintain its adjustment during use.

It is a further object to provide a scale of this character, having an outer decorative casing which may be readily removed without affecting the adjustment or setting of the scale, and which effectively seals the scale when in place to prevent access of dust or foreign matter thereto.

It is a further object to provide a scale of this character having a removable platter or load platform which may be readily assembled and removed from its operative position without altering the completely sealed condition of the scale as established by said decorative casing.

It is a further object to provide a highly accurate and compact structure of counterbalancing and chart actuating mechanism.

It is a further object to provide a scale having a maximum area of chart to facilitate accurate reading of the computed values therefor and which is compactly arranged throughout so that it requires a minimum of counter space.

It is a further object to provide a simple and effective construction for a sign or advertising display device capable of being changed readily by the user of the scale to display advertising material as desired.

Other objects and advantages will be apparent from the following description, the accompanying drawings, and the appended claims:

Referring to the drawings which disclose a preferred embodiment of the invention, there is shown at 10 a base casting preferably integral and impervious, of generally rectangular shape. A plurality of adjustable feet 11 are positioned beneath the base, having friction pads 12 and being suitably adjustable individually to provide for leveling the scale upon the surface on which it rests.

Figure 1:
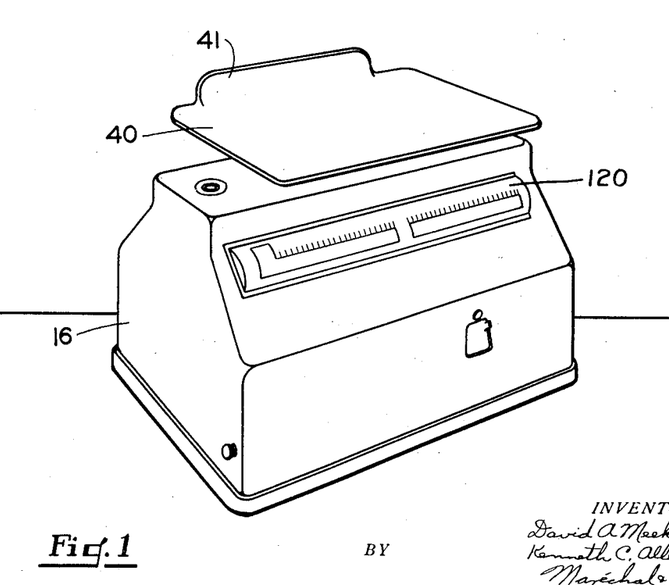
Fig. 1 is a perspective view from the clerk's side showing a scale constructed in accordance with the present invention.
Figure 2:
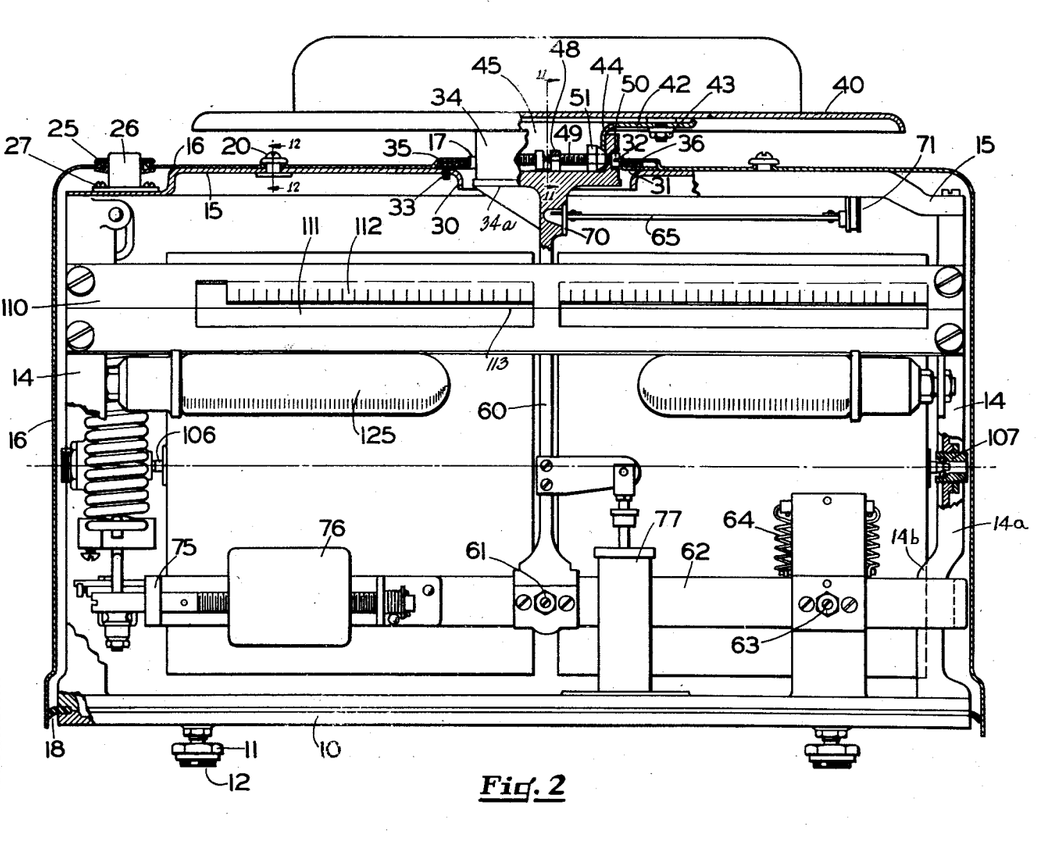
Fig. 2 is a side elevational view within the casing and looking toward the mechanism of the scale, with portions being broken to show the construction more clearly.

A skeleton framework comprising two end members 14 is bolted to and extends upwardly from adjacent each end of the base 10, both the frame and the base being suitably formed of a light-weight casting and provided with strengthening ribs where desired to impart additional strength. As shown in Fig. 2 at the right-hand end of the scale the frame end member 14 is formed with an outwardly projecting flange 14a above the lever, but is offset inwardly with an inwardly projecting flange 14b where it extends between the chart and the lever, thus providing proper strength while reducing the longitudinal dimension of the scale. A cross member 15 is fastened to the top of the two end members 14, and may suitably comprise a stamping which is bolted to the upper ends of members 14, thereby providing a firm framework support for receiving the scale operating parts.

Figures 3, 10, 11, 12:
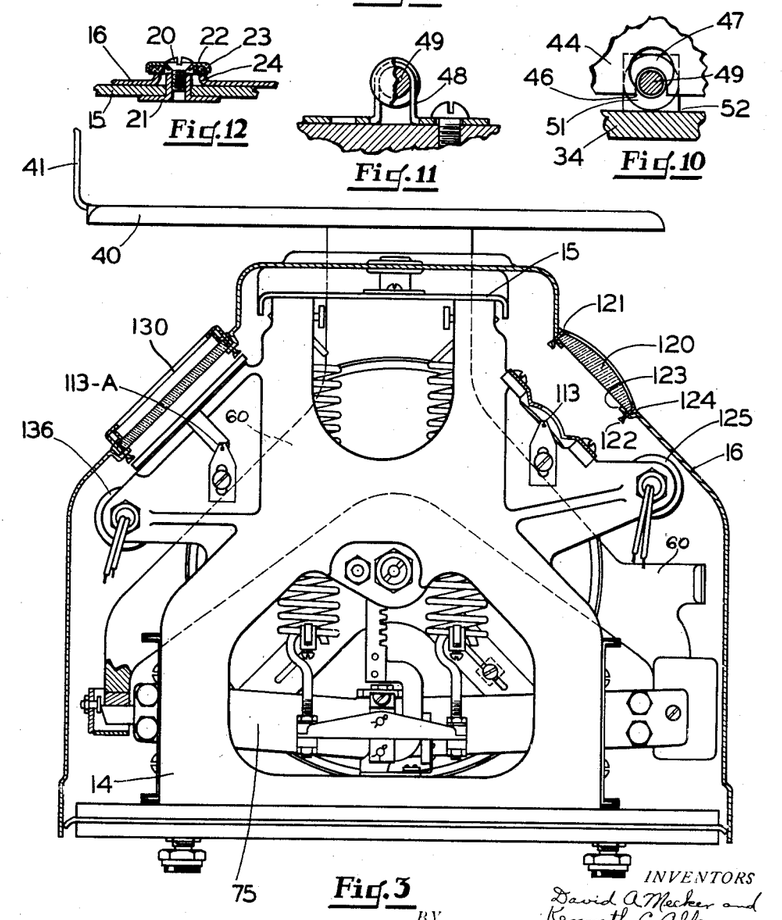
Fig. 3 is an end elevational view within the outer casing, and showing the operating mechanism of the scale.
Fig. 10 is a detail view in vertical section showing the construction of the platter supporting means with the platter partly raised from its operative position.
Fig. 11 is a similar detail sectional view on the line 11—11 of Fig. 2.
Fig. 12 is a detail sectional view on the line 12—12 of Fig. 2, showing the means for fastening the case to the frame of the scale.
Figure 4:
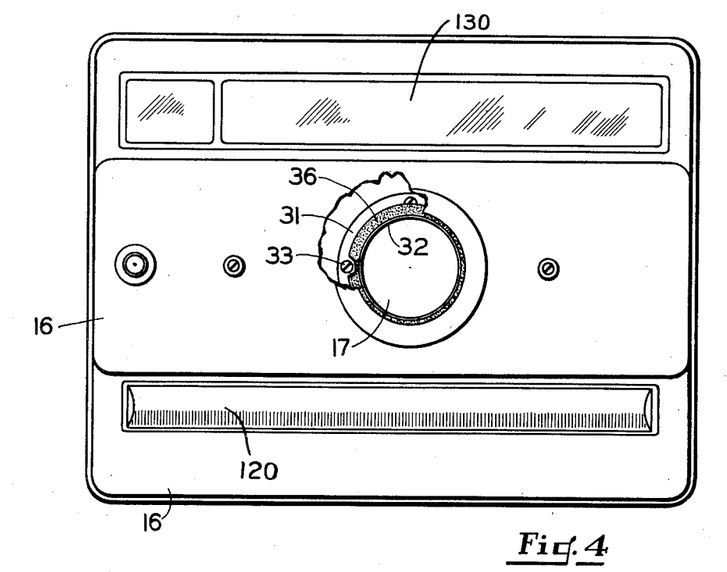
Fig. 4 is a plan view with the platter removed and with portions being broken away to show construction of the sealing means for securing an effective sealing of the outer casing with respect to the scale frame.

An outer decorative enameled shell or casing 16 is shaped to conform generally with the frame member, and is adapted to be fitted downwardly over the frame, and into sealing relation with the base. This casing does not carry the loads and is not subject to the stresses of the scale, which are carried wholly by the frame. It may be readily placed over the frame and removed therefrom with little possibility of damage to the delicate scale parts being guided by the protecting frame. The casing 16 has a central opening at 17 through which the platter supporting means is received and mounted, and at its lower edge extends into sealing relation with a peripheral flexible strip 18 which is fitted within a groove within the base member 10. The strip tends to project horizontally and upon lowering of the casing into position upon the frame, the lower edge of the casing contacts the flexible strip, bending it downwardly, thereby establishing a highly effective sealing contact around the entire lower periphery of the scale to effectively prevent access of dust, insects or other foreign particles thereto. The casing is fastened to the frame member 15 by means of a pair of screws 20 which are received within an upwardly projecting threaded part 21 fastened to the frame member 15 as by welding or the like. Screw 20 has a tapered head, which receives a flanged washer 22, and a gasket 23 adapted to be drawn down into sealing contact with an upwardly projecting flange 24 formed upon the casing member 16. Thus when screw 20 is tightened, the casing will be firmly held upon the frame 15, and the attaching means is adequately sealed and protected.

The casing is also formed in its upper part with an opening for receiving grommet 25 which provides a close internal fit with a cylindrical level casing 26, suitably fastened by screws 27 to the frame member 15. Thus the level is not carried by the casing, but is carried by the frame itself and projects upwardly through the grommet in relatively close sealing relation so that again access of dust and the like is prevented, and an effectively sealed condition is maintained in the scale, the casing as described being readily removable upwardly without removal of any of the operating parts.

Figure 13:
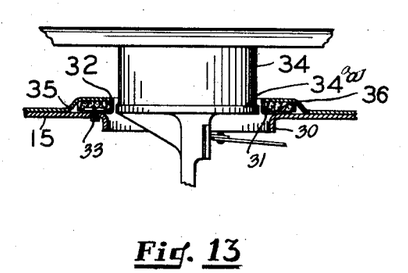
Fig. 13 is a view showing the construction of the platter supporting member which provides for sealing the interior of the scale, the platter being in raised or substantially no-load position.

The frame 15 is curved downwardly as shown at 30 in line with opening 17 in the casing, to provide for receiving the platter support. An annular ring 31 having an inner upstanding flange 32 is fastened to the frame 15 by means of screws 33, the inner diameter of flange 32 being only slightly in excess of that of the member 34 constituting the platter support. As shown in Fig. 13 member 34 has a lower circular rib 34a of slightly larger diameter than the main body of the support, the rib being adapted to closely approach the inner wall of flange 32 in the no-load position of the scale to provide a close seal effectively preventing passage of foreign matter. When a load is placed upon the platform, member 34 moves downwardly, bringing the portion of the body of lesser diameter opposite flange 32, to provide somewhat greater clearance to accommodate the arcuate movement of member 34, the clearance still being sufficiently close to maintain an effective sealed relation. The casing 16 is formed with an annular offset portion 35 and between this offset and the member 31 there is positioned an annular piece of felt or the like 36 which forms a seal between the casing and the frame member. This construction, together with the close clearance of the platter support, completes the sealing construction which provides for maintaining the interior of the scale free of foreign matter.

The platter is shown at 40, as comprising a generally flat plate having an upwardly projecting edge 41 at the customer's side of the scale. The platter is supported by means of a member 42 bolted to the underside of the frame at 43 and having a downwardly extending annular flange 44 adapted to be received within an inner recess 45 of the platter holding member 34. It is desired to provide for removing this platter simply and readily from the supporting device and without danger of contacting the frame or casing of the scale at any time. For this purpose the lower end of the flange 44 is provided with two notches 46 opening into somewhat larger circular openings 47, at diametrically opposite points. Within the recess 45 there is mounted a pair of inner bearing members 48 each of which receives the end of an adjusting stud 49, such stud extending substantially flush or slightly inwardly of the outer wall of member 34 and having an exposed head 50 adapted to be turned by means of a screwdriver or the like. Bearing member 48 provides for turning of the stud while preventing axial movement thereof. Threadedly mounted upon each stud radially inwardly of the assembled position of the flange 44, is a clamping nut 51 having a frusto-conically shaped engaging surface adapted to enter the circular openings 47 formed in the flange. Nut 51 also has a flattened face 52 formed thereon adapted to contact the bottom of the recess formed in the member 34, to provide for axial movement of the clamping nut upon rotation of its respective stud while preventing rotational movement thereof.

In the assembly of the platter upon the holding member, the two clamping nuts 51 are first adjusted inwardly by rotation of the respective studs 49, and the platter then positioned with the flange fitting within the recess 45, and the slots 46 passing downwardly over the respective studs 49. When in this position, the studs 49 are rotated by means of a screwdriver or the like from the exterior to cause radial movement of the nuts 51 outwardly, the frusto-conical faces thereof engaging firmly within the circular apertures 47, thereby clamping and holding the platter firmly upon the support member. Because of the construction just described, which makes it impossible for the heads of the studs to move outwardly to a point such as to contact the frame in the movement of the platter supporting device, the close clearance above described is feasible, and in practice has been found to provide the necessary air passage for the interior of the sealed scale, while preventing objectionable ingress of foreign matter, dust or the like. It will also be noted that the platter may be removed and replaced without affecting the completely sealed condition of the scale.

The platter support 34 is formed integrally with a yoke member 60 which extends downwardly centrally of the scale between the two portions of the chart, and is supported by suitable knife edges 61 upon the lever 62. The lever is fulcrumed as shown at 63, and suitable means indicated at 64 may be utilized to yieldingly retain the lever bearing members upon their respective pivots and resisting the tendency to lift away from the pivots in response to a load positioned eccentrically upon the platform. A suitable device for this purpose is that shown in the copending Patent No. 2,137,150 issued November 15, 1938, and assigned to the same assignee as this application.

Figure 9:
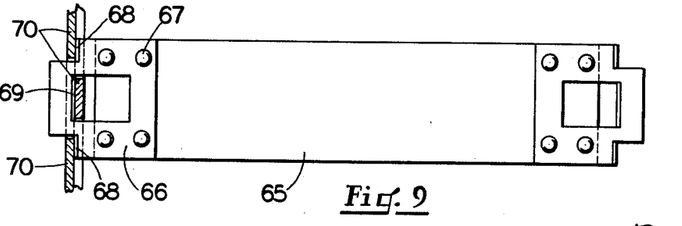
Fig. 9 is a detail view showing the checklink construction.

In order to cause the yoke 60 to maintain a proper vertical position during its movement, a checklink 65 is provided. The checklink is formed with a main plate portion as shown which may be made of a suitable material having a low or negligible temperature differential such as cold rolled steel. To secure accuracy of construction, thrust plates 66 are riveted to the respective ends of the member 65 by means of a plurality of rivets 67, the thrust plates being formed with two external knife edges 68, and one internal knife edge 69. These knife edges cooperate in the usual manner with the bearing members 70 carried by the yoke 60 and by a support 71 adjustably mounted on the scale frame, to cause proper guiding and contacting relation in both directions. In this construction, the two thrust plates are first made and processed as required, including case hardening and heat treatment, before being assembled with the main body of the checklink. The finished thrust plates may then be accurately positioned at definite spacing with respect to each other, and in such definite position riveted to the part 65, to thus provide without further heat treatment a checklink of definite length and substantially free of strains. The result is to provide an assembled structure simply and with great accuracy, being substantially free of any twisting strains or the like and being of precise predetermined length.

The lever 62 is preferably formed of a unitary section of cold rolled steel or the like in the form of an open U. The open end of the U is closed by means of cross piece 75 which is suitably bolted to the ends of the lever to form a closed loop extending across each end of the chart as well as along both faces thereof. An adjustable counterweight 76 and the dashpot 77 are provided in the usual manner.

The lever crosspiece 75 is provided with an integrally extending flanged part 78, substantially centrally of the scale, and to this flange is adjustably fastened a nose iron 79, fastening screw 80 and adjusting screw 81 providing for properly positioning the nose iron with respect to the lever to provide for adjusting the effective length of the lever and hence the lever ratio. The nose iron is formed with a downwardly extending knife edge 82 which extends within a groove 83 formed in bearing member 84. Member 84 is carried by means of a pin 85 which extends therethrough and fastens the same to spaced flanges 86 formed integrally with an equalizer yoke 87. Guide pieces 88 are bolted to the member 84 at 89, to guide the nose iron in its movement in the groove, and to prevent longitudinal displacement thereof.

Figure 15:
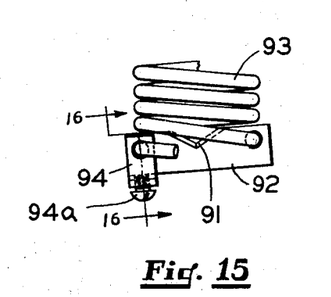
Fig. 15 is a detail view showing the means for calibrating and fastening the end of the counterbalancing springs.
Figure 16:
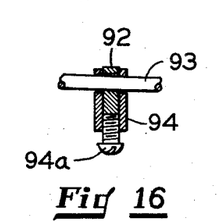
Fig. 16 is a detail sectional view on the line 16—16 of Fig. 15.

The yoke 87 is bolted at each end to upwardly extending hooks 90 which hook over the knife edge 91 formed on calibrator bars 92 which are adapted to determine the effective length of counterbalancing springs 93. The upper ends of the springs are suitably held in fixed relation upon frame member 14, and the portion of the spring subject to elongation is controlled by threading the calibrator bar upon the lower end of the spring, to a position such as to give the proper relation between the applied load and the elongation of the spring. In order to precisely determine the length of the spring subject to elongation, the end of the spring passes through an aperture in one end of the calibrator bar and is also threaded through a second opening at the opposite end of the bar. A U-shaped clamp member 94 fitting over the bar is also apertured to receive this end of the spring and upon tightening of screw 94a the end of the spring is securely held in fixed position, such flexing of the last half turn of the spring as may take place being always proportional to the applied loads. Passing of the spring through the two spaced apertures in the bar and clamping the stub end thereof which projects through the second aperture provides for definitely holding the spring against twisting and thus avoiding variation taking place in its effective length during use. The entire counterbalancing mechanism is located inwardly of and protected by frame member 14.

Figures 5, 6, 7, 8:
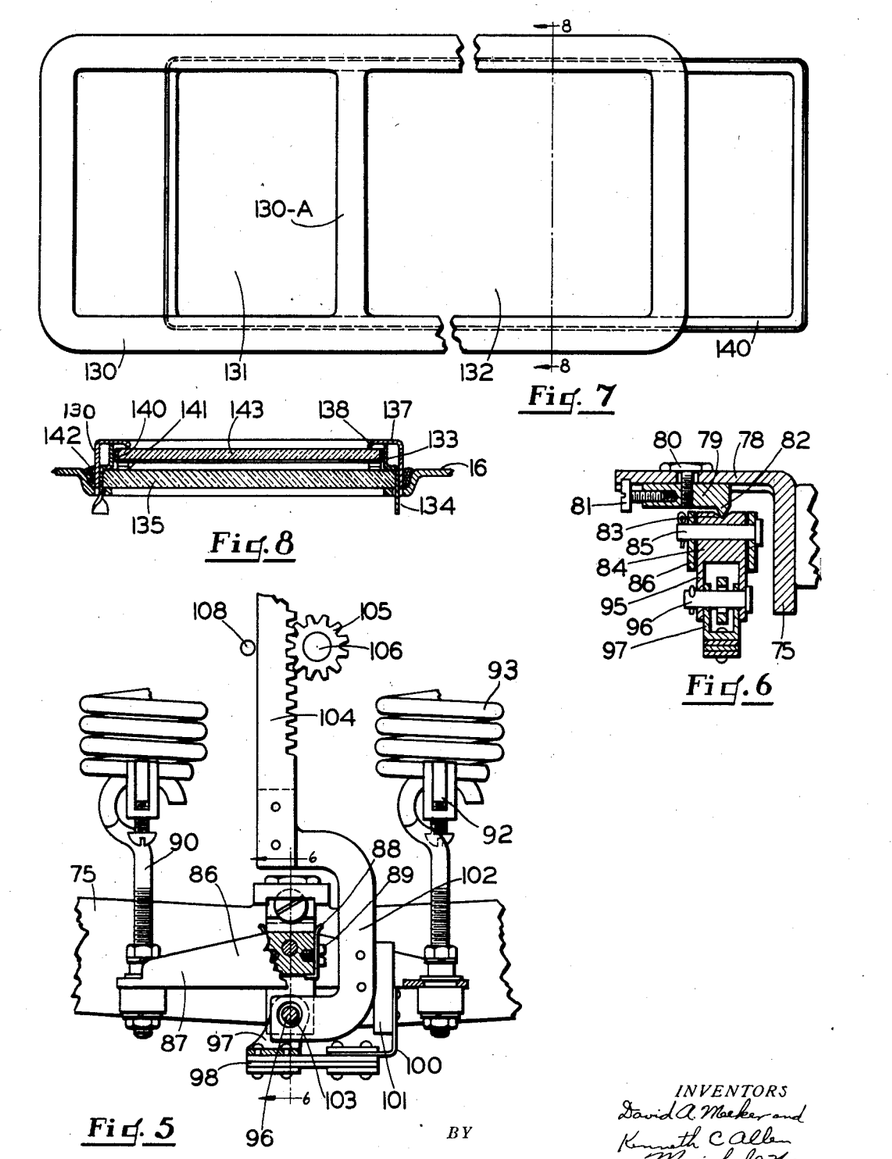
Fig. 5 is a partial view in end elevation showing the detail of the counterbalancing and compensating mechanism.
Fig. 6 is a vertical sectional view on the line 6—6 of Fig. 5.
Fig. 7 is a detail plan view showing the sign frame device.
Fig. 8 is a sectional view on the line 8—8 of Fig. 7.

In order to provide for actuation of the drum chart in response to movements of the lever, the bearing member 84 is formed integrally with a pair of depending arms 95 through the lower part of which passes pin 96. Received inwardly of arms 95 upon the pin is a bracket member 97, the two arms of which are suitably apertured to receive this pin in supporting relation. To the lower end of bracket 97 is riveted a temperature compensating device 98, comprising a bimetallic strip relatively short in length, but adapted to flex in response to temperature changes, to provide compensation for the change in the length characteristics of the spring members with respect to the change in length of spring supports and the chart actuating device as a result of temperature variation. A shock spring 100 is riveted to the free end of the temperature compensating member and is bent at right angles for connection with bracket 101 which is riveted to the base of a U-shaped arm 102 which arm passes around the nose iron and bearing assembly described above and extends above and below the same in vertical alignment therewith. The lower end of the U-shaped arm is provided with an enlarged opening 103 which is received upon cross pin 96, with some clearance in all radial directions, so that in the normal operation the arm does not contact pin 96. In response to shock however and the flexing of the shock spring 100, the arm is brought into contact with the pin to prevent excessive movement thereof. To the upper end of the arm is riveted a rack 104 which projects into actuating relationship with pinion 105 carried upon the shaft 106 which supports the drum charts, the chart being formed in two portions, which are carried upon a common shaft for simultaneous rotation, the shaft being suitably journalled at either end in the frame by bearing means 107.

In the operation of the scale, weight being applied to the load platform, the platform moves downwardly in a vertical plane guided by the checklink, effecting downward movement of the lever and of the cross lever in proportion to the weight applied. The movement of the nose iron 82 thus takes place in an arc, the center being that of the axis of the pivots 63. Because of the fact that the nose iron is spaced substantially below knife edges 91 and hooks 90 upon which the force of the spring is exerted the springs and hooks are inherently pulled into the plane including the nose iron and the upper spring supports, the structure supporting rack 104 being such that it must lie in the plane of hooks 90. The yoke assembly 87 and rack 104, however, inherently move in the plane of the springs, and thus respond by direct linear movement in proportion to the weight applied to the lever. Downward movement of bearing member 84 is transmitted through pin 96, bracket 97, compensating device 98, shock spring 100 and bracket 101 to the rack member 104. The construction for actuating the drum is such that the rack 104 inherently follows a vertical movement without the necessity for side guiding means, and thus provides for rotation of the chart accurately in proportion to the movement of the springs, and the weight applied. A single guide pin 108 is provided axially related with respect to the pinion 105, to prevent any tendency of the rack to leave the teeth of the pinion as a result of rapid change in weight upon the platform. The absence of side guides provides reduced friction and increased accuracy, and further makes it possible to make adjustments in the nose iron as required without the necessity for making corresponding adjustment in guide rollers, the construction being such that the rack assembly tends itself to move in the proper path. Thus the entire counterbalance and chart actuating mechanism may be compactly positioned between the frame end member 14 and the end of the chart without providing accessibility for adjustment of guide rollers, etc.

The charts carry weight indications adapted to be read by the clerk and by the customer, and also carry a series of computed values adapted to be read only by the clerk. For this purpose a reading plate 110 is fastened to the frame members 14 and is provided with an opening 111 therein for cooperation with a series of unit price indications 112 to facilitate the reading of the computed values at the unit prices. A reading line 113 is carried in such position as to be visible through the sight opening 111 in relation to the unit price and the computed value thereof. Member 110 is formed as a continuous uninterrupted plate overlying both halves of the chart, yoke 60 as shown in Fig. 3 passing downwardly beneath plate 110.

A magnifying lens 120 is positioned in line with the reading line 113 and adapted to be used by the clerk in reading the scale and the computed price valuations. Such magnifying lens is received within a metal frame piece 121 which is formed with inwardly extending lugs 122 adapted to pass through apertures formed in recessed flanges 123 integral with casing 16. When thus positioned in place, the inner end of the lugs 122 is twisted or clamped over, to thereby firmly hold the lens in assembled position. Suitable sealing compound 124 is positioned beneath the peripheral edge of the frame member 121 and the adjacent face of the casing, maintaining a tightly sealed construction. Illuminating means 125 are positioned to direct light upon the chart to enable the same to be read, and are controlled by a switch which causes the lights to be turned on whenever a load is placed upon the platform.

On the customer's side of the scale the computed valuations are of course reversed and not in position to be legible and hence are blocked out by suitable plates making it impossible for them to be seen. However an inverted weight scale adapted to be read by the customer is provided on the chart and a reading device 113a is provided to enable accurate weight readings to be made. It is also desired to provide means on the customer's side adapted to receive an advertising or display device, advertising for instance a special for the day, or any other item to which particular attention is desired to be directed. For this purpose a sheet metal member 130 extends across the width of the scale, being formed with two openings separated by an integral rib 130a, the part 131 adapted to be in line with the weight readings on the scale, to provide for reading the actual weight of the material upon the platter. The part 132 is of larger extent, and provides for receiving a suitable advertising display or the like. This construction comprises a Z-shaped flanged member 133 welded to the adjacent inner face of member 130 and having inwardly extending lugs 134 formed thereon and passing through apertures in the casing part 16. A piece of translucent material 135, such as a frosted or ground glass plate is received within the angles of the members 133 and provides for transmitting light from the light source 136, while preventing actually seeing through the plate. Preferably the plate 135 extends beneath both parts 131 and 132, only that portion underlying part 132 being frosted, the remainder being clear. An outer flanged member 137 formed integrally with member 130 is formed with an overhanging lip 138 spaced above the outer surface of the plate 135, leaving a narrow elongated slot therein. Within this slot there is slidable the right angularly bent retaining frame 140, to the underside of which are welded longitudinally extending flat spring members 141 which act to yieldingly retain the frame in proper position while providing for sliding of the frame longitudinally of the slot, to position and remove the same therefrom. Suitable sealing material 142 forms a sealed connection between the body of the casing and the sign assembly. A glass plate 143 is carried by the frame 140.

In the use of the scale, the frame 140 is withdrawn and any desired lettering applied to the glass plate 143 carried thereby. The frame is then replaced in the holder and thus forms a readily changeable sign which may indicate the special for that particular day. Each time the scale is used, illumination of this sign as well as of the adjacent weight reading is effected, and the sign thus stands out clearly, arresting the attention of the customer. A single glass plate 143 is shown which is adapted to directly receive the lettering in removable paint; if desired however this may take the form of a pair of relatively thin transparent plates between which is received a paper or like strip containing the lettering desired. In such latter case these paper strips may be printed for different products and in different colors, forming a highly attractive advertising device for use in connection with the scale.

Figure 14:
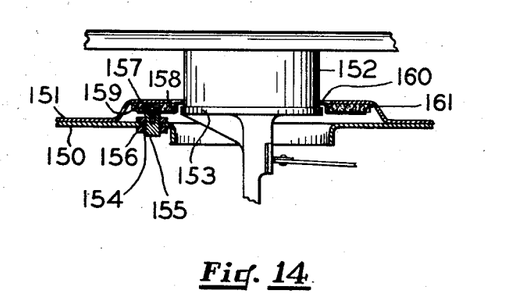
Fig. 14 is a view showing a modified construction of such sealing means.

Fig. 14 shows a modified construction for sealing the interior of the scale against the access of foreign matter. In this construction the frame is shown at 150, a casing at 151 and a platter supporting member at 152 having a main body portion and a lower circular rib 153 of slightly greater diameter than the body portion. The frame 150 has a series of enlarged apertures 154 therethrough through which extend studs 155 adjustably clamped in place thereon by lock nuts 156. The stud is internally threaded to receive fastening screw 157 which holds an annular flange 158 in place through spring washers 159. The flange is formed with an upwardly offset portion 160 adapted to overlie rib 153 so that in the no load position of the platform, rib 153 will establish close sealing engagement with portion 160, approaching closely though preferably not actually contacting therewith. Should the platter support rise above its no load position, causing rib 153 to strike portion 160, the resilient spring members 159 yield to avoid any deleterious shock to the scale mechanism. In the weighing positions, the scale is effectively sealed, with proper clearance being provided for movement. The construction described provides for accurately positioning the flanged member in proper operating position both laterally and vertically. Felt washer means 161 provides for sealing the outer casing and the frame member to each other.

While the form of apparatus herein described constitutes the preferred embodiment of the invention, it is to be understood that the invention is not limited to this precise form of apparatus, and that changes may be made therein without departing from the scope of the invention which is defined in the appended claims.

What is claimed is:

1. A scale of the character described which comprises a base, a frame extending upwardly from the base, a chart supported by said frame, an enclosing decorative casing adapted to be received over said frame and having an opening therein for the movable platter support, a flexible strip mounted on said base and adapted to normally extend laterally outward from the periphery of the base into a position to be engaged and bent downwardly by said enclosing casing when received in position over said frame for sealing the lower peripheral edge of said casing with respect to said base, a load receiving platter, a substantially cylindrical platter supporting member extending upwardly through said opening in said casing, an annular member sealed with respect to said opening in said casing and closely approaching the wall of said platter supporting member throughout its periphery to maintain an effective sealing of the interior of the scale, and means positioned within the confines of said platter supporting member for removably fastening said platter in place thereon while maintaining the interior of said scale substantially sealed.

2. A scale of the character described which comprises a base, a frame extending upwardly from the base, a chart supported by said frame, an enclosing decorative casing adapted to be received over said frame and having a substantially cylindrical opening therein, a load receiving platter, a substantially cylindrical platter supporting member extending upwardly through said opening in said casing, said platter supporting member having an internal recess opening upwardly, means mounted within said recess and positioned substantially entirely within the confines of said platter supporting member for receiving and removably fastening said platter in place on said platter supporting member, said platter having cooperatively formed parts adapted to be moved downwardly to be received and held within said recess.

3. A scale of the character described which comprises a base, a frame extending upwardly from the base, a chart supported by said frame, an enclosing decorative casing adapted to be received over said frame, a load receiving platter, a platter supporting member extending upwardly through an opening in said casing, said platter supporting member having an internal recess formed therein, an adjustable threaded member positioned in said recess and having an operating part extending through the wall in said platter supporting member providing for access thereto, means supporting said threaded member for rotation and preventing axial movement thereof outwardly beyond said platter supporting member, and fastening means threadedly engaged upon said threaded member and adapted to be moved into engaging relation with said platter upon rotation of said threaded member.

4. A scale of the character described which comprises a base, a frame extending upwardly from the base, a drum chart supported by said frame, an enclosing decorative casing adapted to be received over said frame, a load receiving platter, a platter supporting member extending upwardly through an aperture formed in said casing, and a flanged member mounted on said frame in a position to extend around said aperture and in sealed relation with said casing when in position over said frame, said flanged member closely approaching said platter supporting member to maintain an effectively sealed condition with said scale.

5. A scale of the character described which comprises a base, a frame extending upwardly from the base, a drum chart supported by said frame, an enclosing decorative casing adapted to be received over said frame, a load receiving platter, a platter supporting member extending upwardly through an aperture formed in said casing, a flange fastened to said frame to extend around said aperture and closely approaching said platter supporting member to maintain an effectively sealed condition with said scale, and a layer of sealing material between said casing and said flange to prevent passage of dust or foreign matter therebetween.

6. A scale of the character described which comprises a base, a frame extending upwardly from the base, a drum chart supported by said frame, an enclosing decorative casing adapted to be received over said frame, a load receiving platter, a platter supporting member extending upwardly through an aperture formed in said casing and a flange fastened to said frame to extend around said aperture and closely approaching said platter supporting member to maintain an effectively sealed condition with said scale, said platter supporting member having a rib formed thereon adapted to closely approach said flange in the no load position of the scale.

7. A scale of the character described which comprises a base, a frame extending upwardly from the base, a chart supported by said frame, an enclosing casing adapted to be received over said frame, a load receiving platter, a platter supporting member having a circular rib formed thereon and extending upwardly through an aperture formed in said casing, a flange member resiliently supported from said frame and having a part adapted to encircle said platter supporting member above said rib, said flange and said rib providing for maintaining an effectively sealed condition within said scale.

8. A scale of the character described which comprises a base, a frame extending upwardly from the base, a drum chart supported by said frame, an enclosing decorative casing adapted to be received over said frame, flexible means for sealing the lower peripheral edge of said casing with respect to said base, a load receiving platter, a platter supporting member extending upwardly through an opening in said casing and approaching the wall of said casing closely to maintain an effective sealing of the interior of said scale, fastening means for fastening said casing to said frame operable from the exterior of the casing and including a threaded member extending through an aperture provided in said casing, said aperture having a diameter substantially greater than said threaded member, and sealing means positioned between the fastening means and the frame to prevent passage of dust or foreign matter through said aperture.

9. A scale of the character described comprising a base, a frame member extending upwardly from either end of the base, an enclosing decorative casing adapted to be received over said frame to enclose the scale and prevent access of dust and foreign matter thereto, a drum chart rotatably supported by said frame and occupying a substantial part of the area of said casing, a lever in the form of a closed loop mounted in said casing in surrounding relation with respect to said drum chart, counterbalancing mechanism for said lever located at one end of the scale inwardly of the adjacent frame member, said lever extending across the chart at one end on the inside of said frame member between the chart and said counterbalancing mechanism and at the other end of the chart extending across the chart on the outside of the adjacent frame member and between said frame member and said casing, and said frame member adjacent said counterbalancing mechanism having an opening therein providing for access to said lever to effect adjustment thereof relatively to the counterbalancing mechanism.

10. A scale of the character described comprising a base, a frame member extending upwardly from either end of the base, an enclosing decorative casing adapted to be received over said frame to enclose the scale and prevent access of dust and foreign matter thereto, a drum chart rotatably supported by said frame and occupying a substantial part of the area of said casing, a lever in the form of a closed loop, counterbalancing mechanism for said lever located at one end of the scale inwardly of the adjacent frame member, said lever extending across the chart at one end between the chart and said counterbalancing mechanism and at the other end of the chart extending across the chart on the outside of the adjacent frame member and between said frame member and said casing, said last-mentioned frame member being offset to pass inwardly of said lever, both said lever and said last-mentioned frame member extending closely adjacent said casing.

11. A scale of the character described comprising a base, a frame member extending upwardly from either end of the base, an enclosing decorative casing adapted to be received over said frame, a drum chart rotatably supported by said frame, a lever in the form of a closed loop, counterbalancing mechanism for said lever located at one end of the scale inwardly of the adjacent frame member, said lever extending across the chart at one end between the chart and said counterbalancing mechanism and at the other end of the chart extending across the chart on the outside of the adjacent frame member and between said frame member and said casing, said last-mentioned frame member being offset to pass inwardly of said lever and having an outwardly facing strengthening rib above said offset portion and an inwardly facing strengthening rib below said offset portion.

12. A scale of the character described comprising a base, a frame member extending upwardly from each end of the base, a drum chart rotatably supported by said frame, an outer decorative casing fitting over said frame and substantially completely enclosing said scale to prevent access of dust or foreign matter thereto, a lever, a counterbalancing mechanism for said lever including a pair of springs fastened to the upper end of said frame and positioned in protected positioning inwardly thereof, an equalizer member connected to said springs on the inside of said frame, said frame having an opening therein adjacent said equalizer member, means on said lever and accessible for adjustment through said opening in the frame member for engaging said equalizer member, and means positioned inwardly of said frame member providing an operating connection between said equalizer member and said chart and including means accessible through said opening in the frame member for supporting and guiding said operating connection solely from said equalizer member.

13. A scale of the character described comprising a base, a frame member extending upwardly from each end of the base, a drum chart rotatably supported by said frame, an outer decorative casing fitting over said frame and substantially completely enclosing said scale to prevent access of dust or foreign matter thereto, a lever, a counterbalancing mechanism for said lever including a pair of springs fastened to the upper end of said frame and positioned in protected positioning inwardly thereof, an equalizer member connected to said springs on the inside of said frame, means on said lever for adjustably engaging said equalizer member, said frame having an opening therein providing access to said adjustable engaging means of said lever, and means positioned inwardly of said frame providing an operating connection between said equalizer member and said chart and including means accessible through said opening in the frame for supporting and guiding said operating connection solely from said equalizer member and tending to inherently maintain the connecting means in the plane of said springs upon adjustment of said engaging means of the lever and operation of the scale.

14. A scale of the character described comprising a base, a frame member extending upwardly from said base, a chart supported by said frame, an outer casing fitting over said frame and substantially completely enclosing said scale to prevent access of dust or foreign matter thereto, a lever, a counterbalancing mechanism for said lever including a pair of springs fastened to the upper end of said frame and positioned inwardly thereof, a calibrator bar adjustably positioned on the lower end of each of said springs, means for fastening said calibrator bars upon said springs providing for definitely determining the effective length of the springs subject to elongation, an equalizer member carried by said calibrator bars, means on said lever for engaging said equalizer member, and means carried by said equalizer member for actuating said chart.

15. In a scale of the character described having a large available chart area in proportion to the length and breadth thereof, and comprising a base, a frame member adjacent each end of said base, a drum chart rotatably mounted in said frame, a lever extending across one end of said chart, means for mounting said lever for pivotal movement about an axis at right angles to the axis of said chart, and counterbalancing mechanism for said lever located inwardly of said frame member and including a pair of springs each having the upper end thereof supported on said frame, an equalizer member, means for connecting said equalizer member to the lower ends of said springs and positioned below the ends thereof to effect movement of said equalizer member in the plane of said springs, a nose iron on said lever adapted to engage said equalizer, an operating connection between said equalizer and said chart, and means for maintaining said operating connection in the plane of said springs and said equalizer member to secure proper correlated operation of said chart corresponding to displacements of said lever.

16. In a scale of the character described having a large available chart area in proportion to the length and breadth thereof, and comprising a base, a frame member adjacent each end of said base, a drum chart rotatably mounted in said frame, a lever extending across one end of said chart, and counterbalancing mechanism for said lever located inwardly of said frame member and including a pair of springs each having one end thereof supported on said frame, an equalizer member connecting the opposite ends of said springs, a nose iron on said lever adapted to engage said equalizer, an operating connection between said equalizer and said chart, means providing for flexing of said operating connection in response to shock within a predetermined limited degree, and means for limiting the extent of said flexing movement.

17. A scale of the character described which comprises a base, a frame extending upwardly from said base, a drum chart supported by said frame, an enclosing decorative casing adapted to be received over said frame, a load receiving platter, a platter supporting member extending upwardly through an aperture provided in said frame, said casing having a relatively large aperture adapted to receive said platter supporting member and providing substantial clearance with respect to said member for ready removal and replacement of the casing thereover, and sealing means located between said frame and said casing when in assembled relation and arranged in sealed relation with respect to said casing and said frame, said sealing means closely approaching said platter supporting member to reduce the clearance of said casing aperture and provide an effectively sealed condition with respect to the interior of said scale.

DAVID A. MEEKER.
KENNETH C. ALLEN.